(12) United States Patent
Wang et al.

(10) Patent No.: US 10,798,300 B2
(45) Date of Patent: Oct. 6, 2020

(54) METHOD AND DEVICE FOR UNFOLDING LENS IMAGE INTO PANORAMIC IMAGE

(71) Applicant: SHENZHEN PISOFTWARE TECHNOLOGY CO., LTD., Shenzhen (CN)

(72) Inventors: Shibo Wang, Shenzhen (CN); Jingcheng Shen, Shenzhen (CN); Chao Wang, Shenzhen (CN)

(73) Assignee: SHENZHEN PISOFTWARE TECHNOLOGY, Shenzhen (CN)

( * ) Notice: Subject to any disclaimer, the term of this patent is extended or adjusted under 35 U.S.C. 154(b) by 22 days.

(21) Appl. No.: 16/309,806

(22) PCT Filed: Mar. 31, 2017

(86) PCT No.: PCT/CN2017/079093
§ 371 (c)(1),
(2) Date: Dec. 13, 2018

(87) PCT Pub. No.: WO2017/193729
PCT Pub. Date: Nov. 16, 2017

(65) Prior Publication Data
US 2019/0349524 A1  Nov. 14, 2019

(30) Foreign Application Priority Data
May 11, 2016 (CN) .......................... 2016 1 0309937

(51) Int. Cl.
*H04N 5/232* (2006.01)
*G06T 3/00* (2006.01)

(52) U.S. Cl.
CPC ....... *H04N 5/23238* (2013.01); *G06T 3/0018* (2013.01); *G06T 2200/28* (2013.01)

(58) Field of Classification Search
CPC .............. H04N 5/23238; H04N 5/232; H04N 5/23229; G06T 3/0018; G06T 2200/28; G06T 5/006; G06T 3/0056; G06T 15/10
See application file for complete search history.

(56) References Cited

U.S. PATENT DOCUMENTS

| | | | |
|---|---|---|---|
| 2016/0065946 A1 | 3/2016 | Cole | |
| 2016/0065947 A1 | 3/2016 | Cole | |

FOREIGN PATENT DOCUMENTS

| | | | |
|---|---|---|---|
| CN | 101777193 A | 7/2010 | |
| CN | 103839227 A | 12/2012 | |

(Continued)

OTHER PUBLICATIONS

Supplementary European Search Report with Written Opinion for European Patent Application No. 17795347, dated Nov. 27, 2019.

(Continued)

*Primary Examiner* — Nam D Pham
(74) *Attorney, Agent, or Firm* — Steven M. Koehler; Westman, Champlin & Koehler, P.A.

(57) ABSTRACT

The present application provides a method and a device for expanding a lens image into a panoramic image, the method includes: step A, preparing an original mesh model, calculating new mapping coordinate values, performing coordinate value transformation for the original mapping coordinate values of the original mesh model and the calculated new mapping coordinate values, and generating a new mesh model and storing the new mesh model; and step B, preparing a lens image to be expanded, assigning the lens image to be expanded to the new mesh model in step A, and rendering the new mesh model by a GPU to obtain a panoramic image and store the panoramic image.

16 Claims, 6 Drawing Sheets

(56) References Cited

FOREIGN PATENT DOCUMENTS

CN          104240236 A    12/2014
WO       2009068942 A1     6/2009

OTHER PUBLICATIONS

J.M,P. Van Waveren: "The Asynchronous Time Warp for Virtual Reality on Consumer Hardware", Proceedings of the 22nd ACM Conference on Virtual Reality Software and Technology, VRST '16, Jan. 1, 2016, pp. 37-46; ISBN: 978-1-4503-4491-3.

Vegard Oye: Accelerating Nonlinear Image Transformations with OpenGL ES A Study on Fish-Eye Undistortion, Master's Thesis, Jan. 1, 2015, pp. 1-87, Retrieved from the Internet: URL: https://www.duo.uio.no/bitstream/handle/10852/47636/master.pdf?sequence=11&isAllowed=y [retrieved on Nov. 12, 2019].

International Search Report dated Jun. 12, 2017 for corresponding international Application No. PCT/CN2017/079093 filed Mar. 31, 2017.

Written Opinion of the International Searching Authority dated Jun. 20, 2017 for corresponding International Application No. PCT/CN2017/079093, filed Mar. 31, 2017.

US 10,798,300 B2

METHOD AND DEVICE FOR UNFOLDING LENS IMAGE INTO PANORAMIC IMAGE

CROSS-REFERENCE TO RELATED APPLICATION

The present application is a national stage of and claims priority of International patent application Serial No. PCT/CN2017/079093, filed Mar. 31, 2017, and published as WO2017/193729, the content of which is hereby incorporated by reference in its entirety.

TECHNICAL FIELD

The present application pertains to the technical field of image processing, and particularly relates to a method and a device for expanding a lens image into a panoramic image.

BACKGROUND

With the rapid development of VR technology (virtual reality technology), people's demand for VR content (virtual reality content) is becoming more and more intense. Panoramic images and panoramic videos are one of the important components of VR content, and the current panoramic images are generally taken by a camera with a large angle fish eye lens, or generated by mosaicing images that taken by several wide-angle or fish-eye cameras. Since the images taken by the wide-angle or fish-eye cameras are distorted, the image taken by the wide-angle or fish-eye cameras needs to be expanded into a panoramic image through an algorithm. Most of the current panoramic image expansion algorithms run in the CPU (central processing unit), and a few panoramic image expansion algorithms run in the GPU (Graphic Processing Unit, hereinafter referred to as GPU). Due to the large amount of computation of the panorama image expansion algorithms, a frame of image takes a long time to expand, thus generally, high-performance CPUs with high cost, high energy consumption and large volume are used. However, the CPUs are difficult to achieve high-definition or real-time image expansion, and cannot achieve panoramic live broadcast.

SUMMARY

To sum up, in order to solve the above technical problem, the present application is to provide a method and a device for expanding a lens image into a panoramic image, so as to realize the rapid expansion of a lens image into a panoramic image, and reduces the cost and energy consumption of the panoramic device, and reduces the volume of the panoramic device.

First aspect, the present application provides a method for expanding a lens image into a panoramic image, which includes the following steps of:

step A, preparing an original mesh model, calculating new mapping coordinate values, performing coordinate value transformation for the original mapping coordinate values of the original mesh model and the calculated new mapping coordinate values, and generating a new mesh model and storing the new mesh model; and step B, preparing a lens image to be expanded, assigning the lens image to be expanded to the new mesh model in step A, and rendering the new mesh model by a GPU to obtain a panoramic image and store the panoramic image.

Further, the step A includes the following steps of:
step A1, preparing an original mesh model;

step A2, preparing a lens image expanded into panorama for reference;

step A3, assigning the lens image expanded into panorama for reference in the step A2 to the original mesh model in the step A1;

step A4, calculating, according to the orientation parameter, the angle of view, the distortion parameter, the image eccentricity parameter and the displacement parameter of the lens when the lens image expanded into panorama for reference in step A3 is taken, the new mapping coordinate values of each corner of the original mesh model, transforming the original mapping coordinate values of each corner of the original mesh model into corresponding new mapping coordinate values, and generating the new mesh model; and step A5, taking out the lens image expanded into panorama for reference in the step A3, and storing the new mesh model in the step A4.

Further, the step B includes the following steps of:
step B1, preparing a lens image to be expanded;
step B2, assigning the lens image to be expanded in the step B1 to the new mesh model in the step A5;
step B3, rendering the new mesh model in the step B2 through the GPU to obtain the panoramic image corresponding to the lens image to be expanded; and
step B4, storing the panoramic image in step B3.

Further, the shape of the original mesh model may be a rectangle, a sphere, a 360° panorama, a ring, a hemisphere, or other planar geometric or curved solid geometry.

Further, the lens image may be a fish eye lens image, a wide-angle lens image or other form of lens image.

Second aspect, the present application provides a device for expanding a lens image into a panoramic image, which includes:

a new mesh model generating module, configured to store an original mesh model, calculate new mapping coordinate values, perform coordinate value transformation for the original mapping coordinate values of the original mesh model and the calculated new mapping coordinate values, and generate and store a new mesh model; and a panoramic image acquisition module, configured to store a lens image to be expanded, assign the lens image to be expanded to the new mesh model in the new mesh model generating module, and render the new mesh model by a GPU to obtain and store a panoramic image, wherein the panoramic image acquisition module is connected with the new mesh model generating module.

Further, the new mesh model generating module includes:
an original mesh model storage unit, configured to store the original mesh model;

a lens image storage unit, configured to store a lens image expanded into a panoramic image for reference, wherein the storage unit is connected with the original mesh model storage unit;

a first assigning unit for the lens image, configured to assign the lens image expanded into a panoramic image for reference in the lens image storage unit to the original mesh model in the original mesh model storage unit, wherein the first assigning unit is connected with the lens image storage unit;

a processing unit for mapping coordinates of the mesh model, configured to calculate, according to the orientation parameter, the angle of view, the distortion parameter, the image eccentricity parameter and the displacement parameter of the lens when the lens image expanded into panorama for reference in the first assigning unit for the lens image is taken, the new mapping coordinate values of each corner of the original mesh model, and transform the original mapping coordinate values of each corner of the original mesh model into corresponding new mapping coordinate values, and generate the new mesh model, wherein the processing unit is connected with the first assigning unit for the lens image; and a new mesh model storage unit, configured to take out the lens image expanded into panorama for reference in the first assigning unit for the lens image, and store the new mesh model generated in the processing unit for mapping coordinates of the mesh model, wherein the new mesh model storage unit is connected with the processing unit for mapping coordinates of the mesh model.

Further, the panoramic image acquisition module includes:

a storage unit for a lens image to be expanded, configured to store a lens image to be expanded, wherein the storage unit is connected with the new mesh model storage unit;

a second assigning unit for the lens image, configured to assign the lens image to be expanded, in the storage unit for a lens image to be expanded, to the new mesh model in the new mesh model storage unit, wherein the second assigning unit is connected with the storage unit for a lens image to be expanded;

a new mesh model rendering unit, configured to render the new mesh model in the second assigning unit for the lens image through the GPU to obtain the panoramic image corresponding to the lens image to be expanded, wherein the new mesh model rendering unit is connected with the second assigning unit for the lens image; and a panoramic image storage unit, configured to store the panoramic image in the new mesh model rendering unit, wherein the panoramic image storage unit is connected with the new mesh model rendering unit.

Further, the shape of the original mesh model may be a rectangle, a sphere, a 360° panorama, a ring, a hemisphere, or other planar geometric or curved solid geometry.

Further, the lens image may be a fish eye lens image, a wide-angle lens image or other form of lens image.

Compared with the prior art, in the application, the lens image to be expanded is assigned as a map to the new mesh model in which the new mapping coordinate values are calculated and changed in advance, and the new mesh model is rendered through the GPU, thus realizing the rapid expansion of the lens image into the panoramic image, which greatly reduces the cost and energy consumption of the panoramic device, and greatly reduces the volume of the panoramic device. At the same time, we can also realize the production of high-definition and real-time panoramic videos by this method.

EMBODIMENTS

In order to make the purpose, the technical solutions and advantages of the present more clear, the present application will be further described in detail below with reference to the accompanying drawings and embodiments. It should be understood that the specific embodiments described herein are merely illustrative of the application and are not intended to limit the application.

The implementations of the present application will be described in detail below with reference to specific embodiments.

Figure 1:
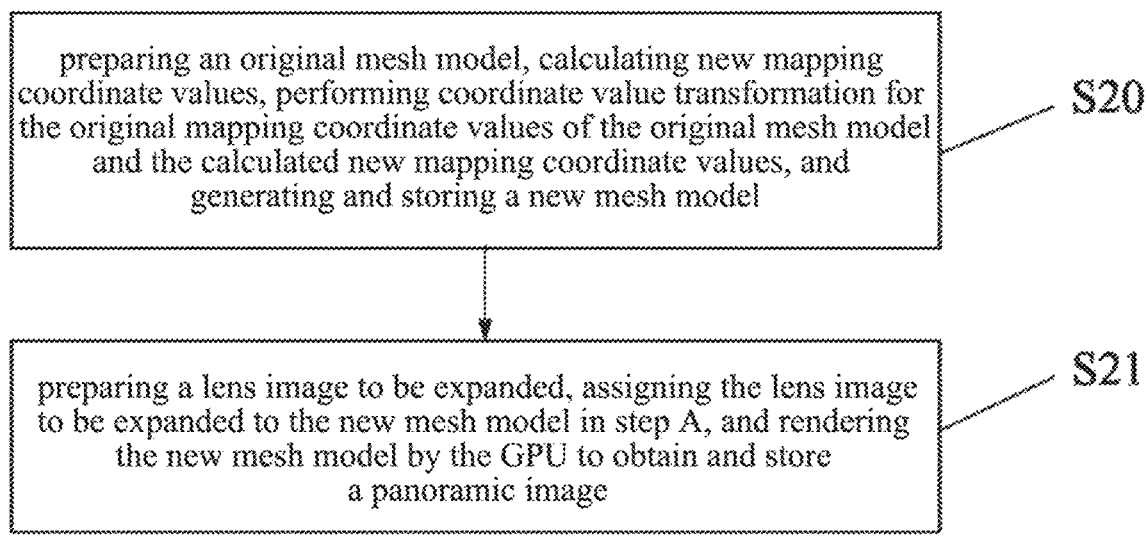
FIG. 1 is a flow char of the method for expanding a lens image into a panoramic image provided by an embodiment of the present application.

Please refer to FIG. 1, FIG. 1 is a flow char of a method for expanding a lens image into a panoramic image provided by an embodiment of the present application. As shown in FIG. 1, the method for expanding a lens image into a panoramic image includes the following steps of:

step S20, preparing an original mesh model, calculating new mapping coordinate values, performing coordinate value transformation for the original mapping coordinate values of the original mesh model and the calculated new mapping coordinate values, and generating a new mesh model and storing the new mesh model; and step S21, preparing a lens image to be expanded, assigning the lens image to be expanded to the new mesh model in step S20, and rendering the new mesh model by the GPU to obtain a panoramic image and store the panoramic image.

Figure 2:
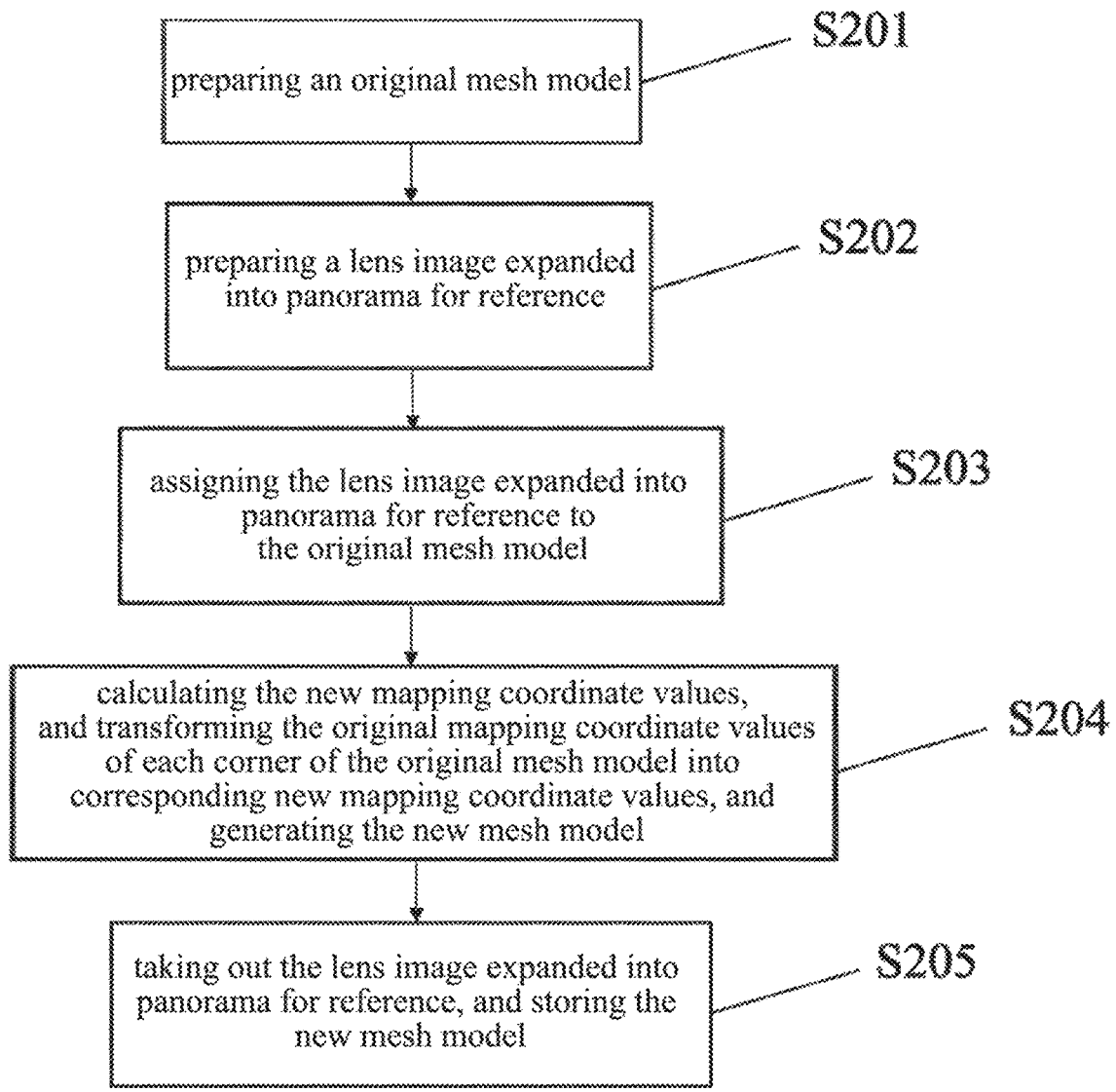
FIG. 2 is a flow chart of the method for generating a new mesh model in FIG. 1.

Please refer to FIG. 2, FIG. 2 is a flow chart of the method for generating the new mesh model in FIG. 1. As shown in FIG. 2, the method for generating the new mesh model includes the following steps of:

step S201, preparing an original mesh model;

step S202, preparing a lens image expanded into panorama for reference;

step S203, assigning the lens image expanded into panorama for reference in the step S202 to the original mesh model in the step S201;

step S204, calculating, according to the orientation parameter, the angle of view, the distortion parameter, the image eccentricity parameter and the displacement parameter of the lens when the lens image expanded into panorama for reference in step S203 is taken, the new mapping coordinate values of each corner of the original mesh model, transforming the original mapping coordinate values of each corner of the original mesh model into corresponding new mapping coordinate values, and generating the new mesh model; and step S205, taking out the lens image expanded into panorama for reference in the step S203, and storing the new mesh model in the step S204.

Figure 3:
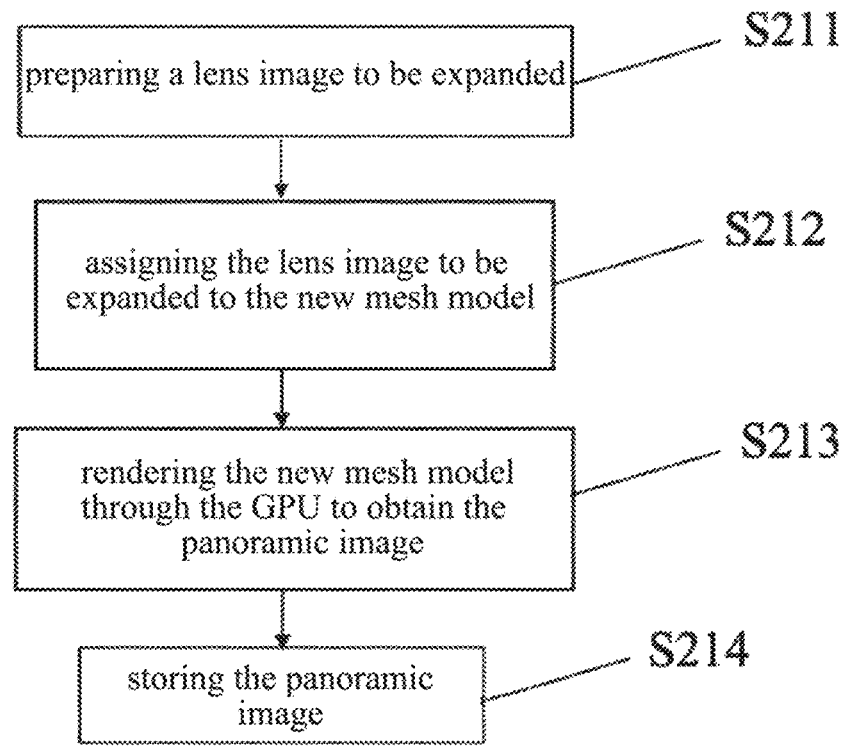
FIG. 3 is a flow chart of the method for acquiring a panoramic image in FIG. 1.

Please refer to FIG. 3, FIG. 3 is a flow chart of the method for acquiring the panoramic image in FIG. 1. As shown in FIG. 3, the method for acquiring the panoramic image includes the following steps of:

step S211, preparing a lens image to be expanded;

step S212, assigning the lens image to be expanded in the step S211 to the new mesh model in the step S205;

step S213, rendering the new mesh model in the step S212 through GPU to obtain the panoramic image corresponding to the lens image to be expanded; and step S214, storing the panoramic image in step S213.

Take an original rectangular mesh model and a fish eye image taken by a camera with a fish eye lens as an example.

Figure 4:
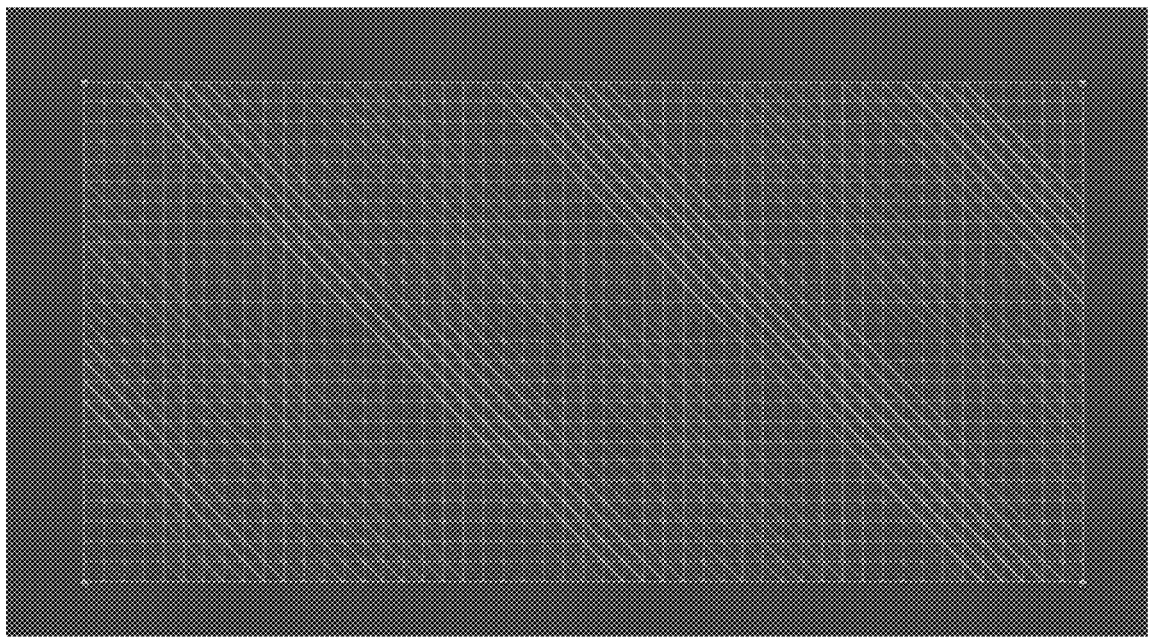
FIG. 4 is an original rectangular mesh model provided by an embodiment of the present application.

Firstly, creating an original rectangular mesh model with an aspect ratio of 2:1 in 3ds Max or other modeling tools. The original rectangular mesh model consists of a plurality of square meshes, therefore the ratio of the segments respectively in length direction and width direction of the original rectangular mesh model is also 2:1. Under normal circumstances, the denser the mesh in the model, the higher the quality of the expanded panoramic image, the better the effect. As shown in FIG. 4, the original rectangular mesh model includes 50 square meshes in the length direction, and 25 square meshed in the width direction.

Figure 5:
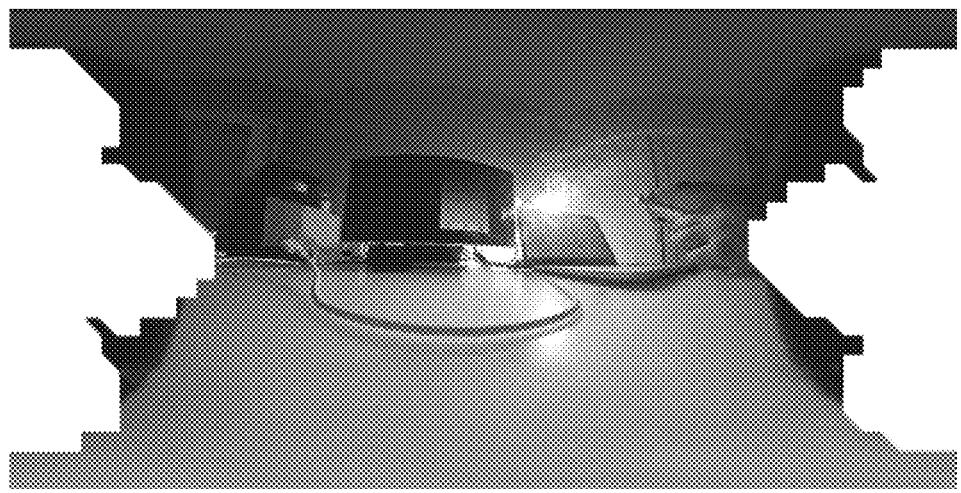
FIG. 5 is an expanded panoramic fish eye image provided by an embodiment of the present application for reference.

FIG. 5 shows a fish eye image expanded into a panorama for reference.

The fish eye image expanded into the panorama for reference as shown in FIG. 5 is assigned as a map to the original rectangular mesh model as shown in FIG. 4, and each mesh in the original rectangular mesh model includes four corners, and each corner includes position coordinates (X, Y, Z) of the mesh and the original mapping coordinates (U, V). We need to calculate, according to the orientation parameter, the angle of view, the distortion parameter, the image eccentricity parameter and the displacement parameter of the lens image expanded into a panorama for reference, the new mapping coordinate values of each corner of the original rectangular mesh model. Since new mapping coordinate values determines which pixels of the fish eye image are attached to the meshes including the corners, the original mapping coordinate values of each corner of the original rectangular mesh model are transformed into their corresponding new mapping coordinate values. Taking position coordinates (15, 9) of a corner for example, the original mapping coordinate value of the corner is (0, 0), and the new mapping coordinate values corresponding to the corner is acquired to be (0.1, 0.3) through calculation, then we transform the original mapping coordinate values (0, 0) of the corner into the new mapping coordinate values (0.1, 0.3), and the new mapping coordinate values for each corner of the original rectangular mesh model are configured in accordance with this method, so as to generate and store the new rectangular mesh model.

Figure 6:
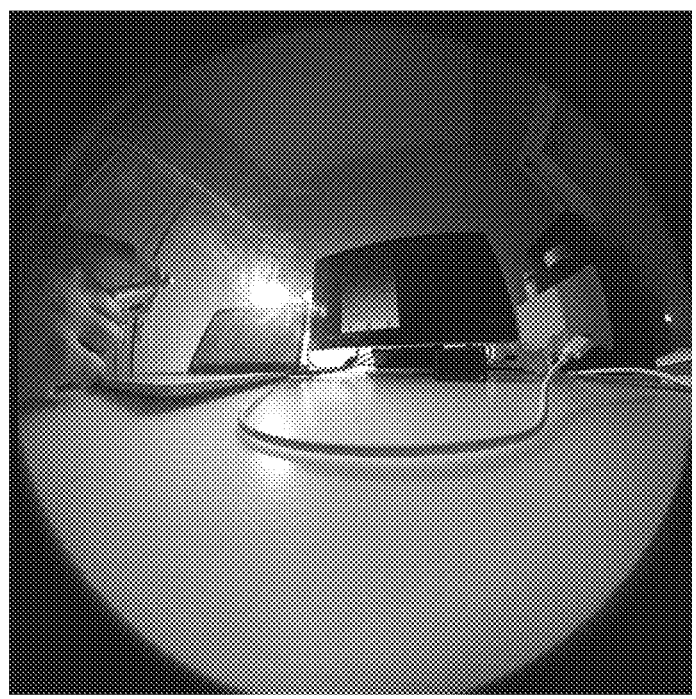
FIG. 6 is a fish eye image to be expanded provided by an embodiment of the present application, wherein the fish eye image is taken by a fish-eye camera.

FIG. 6 shows a fish eye image to be expanded taken by a camera with a fish eye lens, and the fish eye image to be expanded is assigned to a new rectangular mesh model.

Figure 7:
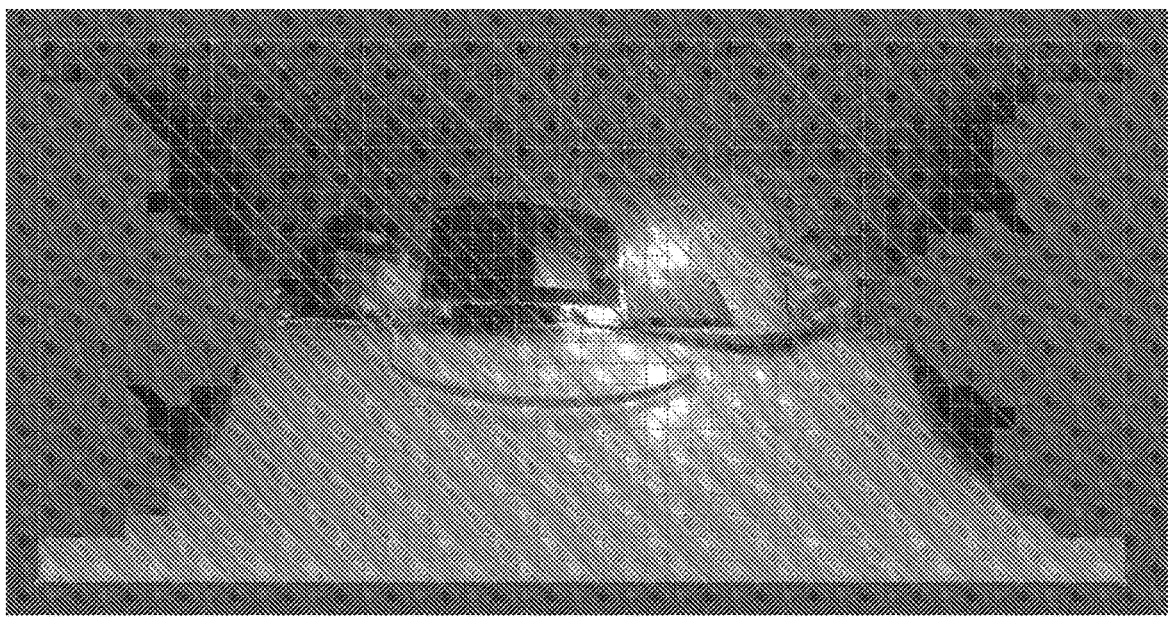
FIG. 7 is a panoramic image acquired through rendering a new rectangular mesh model provided by an embodiment of the present application.

The new rectangular mesh model is rendered by the GPU, to acquire and store the panoramic image corresponding to the fish eye image. As shown in FIG. 7, the panoramic image is acquired by rendering the new rectangular mesh model.

In the embodiments of the present invention, the new mesh model having calculated and transformed the new mapping coordinate values can be stored, and can be directly used next time.

Figure 8:
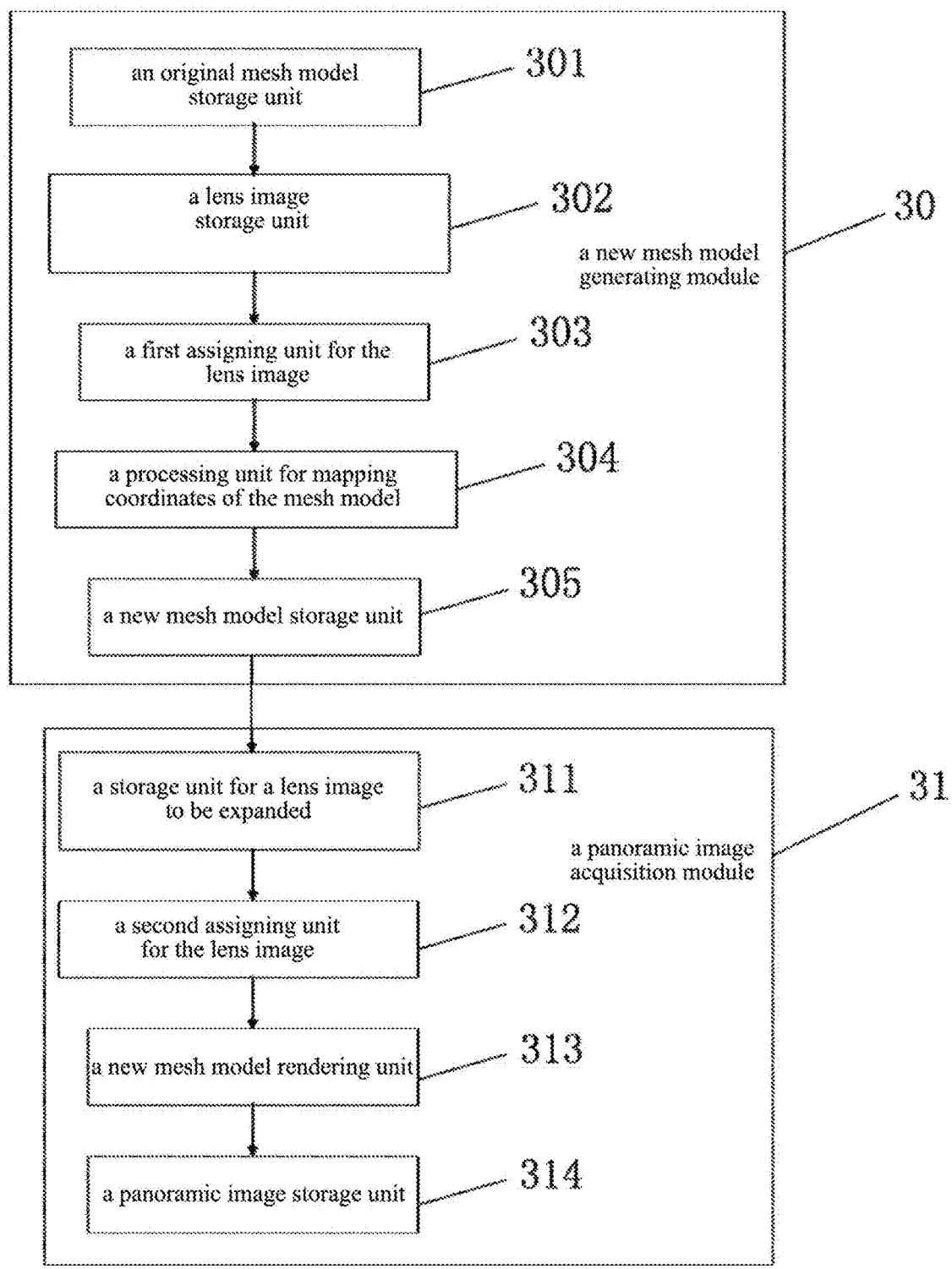
FIG. 8 is a structural schematic view of the device for expanding a lens image into a panoramic image provided by an embodiment of the present application.

Please refer to FIG. 8, FIG. 8 is a structural schematic view of a device for expanding a lens image into a panoramic image provided by an embodiment of the present application. As shown in FIG. 8, the device for expanding a lens image into a panoramic image includes:

a new mesh model generating module 30, configured to store an original mesh model, calculate new mapping coordinate values, perform coordinate value transformation for the original mapping coordinate values of the original mesh model and the calculated new mapping coordinate values, and generate and store a new mesh model; and a panoramic image acquisition module 31, configured to store a lens image to be expanded, assign the lens image to be expanded to the new mesh model in the new mesh model generating module 30, and render the new mesh model by the GPU to obtain and store a panoramic image, wherein the panoramic image acquisition module 31 is connected with the new mesh model generating module 30.

In an embodiment of the present application, the new mesh model generating module 30 includes:

an original mesh model storage unit 301, configured to store the original mesh model;

a lens image storage unit 302, configured to store a lens image expanded into a panoramic image for reference, wherein the storage unit 302 is connected with the original mesh model storage unit 301;

a first assigning unit 303 for the lens image, configured to assign the lens image expanded into a panoramic image for reference in the lens image storage unit 302, to the original mesh model in the original mesh model storage unit 301, wherein the first assigning unit 303 is connected with the lens image storage unit 302;

a processing unit 304 for mapping coordinates of the mesh model, configured to calculate, according to the orientation parameter, the angle of view, the distortion parameter, the image eccentricity parameter and the displacement parameter of the lens when the lens image expanded into panorama for reference in the first assigning unit 303 for the lens image is taken, the new mapping coordinate values of each corner of the original mesh model, and transform the original mapping coordinate values of each corner of the original mesh model into corresponding new mapping coordinate values, and generate the new mesh model, wherein the processing unit 304 is connected with the first assigning unit 303 for the lens image; and a new mesh model storage unit 305, configured to take out the lens image expanded into panorama for reference in the first assigning unit 303 for the lens image, and store the new mesh model generated in the processing unit 304 for mapping coordinates of the mesh model, wherein the new mesh model storage unit 305 is connected with the processing unit 304 for mapping coordinates of the mesh model.

The panoramic image acquisition module 31 includes:

a storage unit 311 for a lens image to be expanded, configured to store a lens image to be expanded, wherein the storage unit 311 is connected with the new mesh model storage unit 305;

a second assigning unit 312 for the lens image, configured to assign the lens image to be expanded, in the storage unit 311 for a lens image to be expanded, to the new mesh model in the new mesh model storage unit 305, wherein the second assigning unit 312 is connected with the storage unit 311 for a lens image to be expanded;

a new mesh model rendering unit 313, configured to render the new mesh model in the second assigning unit 312 for the lens image through GPU to obtain the panoramic image corresponding to the lens image to be expanded, wherein the new mesh model rendering unit 313 is connected with the second assigning unit 312 for the lens image; and a panoramic image storage unit 314, configured to store the panoramic image in the new mesh model rendering unit 313, wherein the panoramic image storage unit 314 is connected with the new mesh model rendering unit 313.

In the embodiments of the present application, the shape of the original mesh model and its corresponding new mesh model may be a rectangle, a sphere, a 360° panorama, a ring, a hemisphere, or other planar geometric or curved solid geometry; the lens image may be a fish eye lens image, a wide-angle lens image or other forms of lens image.

In the application, the lens image to be expanded is assigned as a map to the new mesh model in which the new mapping coordinate values are calculated and changed in advance, and the new mesh model is rendered through the GPU, thus realizing the rapid expansion of the lens image into the panoramic image, which greatly reduces the cost and energy consumption of the panoramic device, and greatly reduces the volume of the panoramic device. At the same time, we can also realize the production of high-definition and real-time panoramic videos by this method.

The above description is only the preferred embodiments of the present invention, and is not intended to limit the present invention. Any modification, equivalent substitution or improvement made within the spirit and principles of the present application should be included in the scope of the present application.

What is claimed is:

1. A method for expanding a lens image into a panoramic image, comprising the following steps of:
    step A,
    step A1, preparing an original mesh model;
    step A2, preparing a lens image expanded into panorama for reference;
    step A3, assigning the lens image expanded into panorama for reference in the step A2 to the original mesh model in the step A1;
    step A4, calculating, according to an orientation parameter, an angle of view, a distortion parameter, an image eccentricity parameter and a displacement parameter of the lens when the lens image expanded into panorama for reference in step A3 is taken, new mapping coordinate values of each corner of the original mesh model, transforming the original mapping coordinate values of each corner of the original mesh model into corresponding new mapping coordinate values, and generating the new mesh model; and
    step A5, taking out the lens image expanded into panorama for reference in the step A3, and storing the new mesh model in the step A4
    step B, preparing another lens image to be expanded, assigning the another lens image to be expanded to the new mesh model in step A, and rendering the new mesh model by a GPU to obtain and store a panoramic image.

2. The method according to claim 1, wherein the step B comprises the following steps of:
    step B1, preparing the another lens image to be expanded;
    step B2, assigning the another lens image to be expanded in the step B1 to the new mesh model in the step A5;
    step B3, rendering the new mesh model in the step B2 through the GPU to obtain the panoramic image corresponding to the another lens image to be expanded; and
    step B4, storing the panoramic image in step B3.

3. The method according to claim 1, wherein the shape of the original mesh model is selected as a rectangle, a sphere, a 360° panorama, a ring, a hemisphere, or other planar geometric or curved solid geometry.

4. The method according to claim 1, wherein the lens image is selected as a fish eye lens image, a wide-angle lens image or other form of lens image.

5. The method according to claim 1, wherein the shape of the original mesh model is selected as a rectangle, a sphere, a 360° panorama, a ring, a hemisphere, or other planar geometric or curved solid geometry.

6. The method according to claim 1, wherein the lens image is selected as a fish eye lens image, a wide-angle lens image or other form of lens image.

7. The method according to claim 2, wherein the lens image is selected as a fish eye lens image, a wide-angle lens image or other form of lens image.

8. The method according to claim 3, wherein the lens image is selected as a fish eye lens image, a wide-angle lens image or other form of lens image.

9. A device for expanding a lens image into a panoramic image, comprising:
    a new mesh model generating module, configured to store an original mesh model, calculate new mapping coordinate values, perform coordinate value transformation for the original mapping coordinate values of the original mesh model and the calculated new mapping coordinate values, and generate and store a new mesh model, wherein the new mesh model generating module comprises:
    an original mesh model storage unit, configured to store the original mesh model;
    a lens image storage unit, configured to store a lens image expanded into a panoramic image for reference, wherein the lens image storage unit is connected with the original mesh model storage unit;
    a first assigning unit for the lens image, configured to assign the lens image expanded into a panoramic image for reference in the lens image storage unit to the original mesh model in the original mesh model storage unit, wherein the first assigning unit is connected with the lens image storage unit;
    a processing unit for mapping coordinates of the new mesh model, configured to calculate, according to an orientation parameter, an angle of view, a distortion parameter, an image eccentricity parameter and a displacement parameter of the lens when the lens image expanded into panorama for reference in the first assigning unit for the lens image is taken, the new mapping coordinate values of each corner of the original mesh model, and transform the original mapping coordinate values of each corner of the original mesh model into corresponding new mapping coordinate values, and generate the new mesh model, wherein the processing unit is connected with the first assigning unit for the lens image; and
    a new mesh model storage unit, configured to take out the lens image expanded into panorama for reference in the first assigning unit for the lens image, and store the new mesh model generated in the processing unit for mapping coordinates of the mesh model, wherein the new mesh model storage unit is connected with the processing unit for mapping coordinates of the mesh model; and
    a panoramic image acquisition module, configured to store another lens image to be expanded, assign the another lens image to be expanded to the new mesh model in the new mesh model generating module, and render the new mesh model by a GPU to obtain and store a panoramic image, wherein the panoramic image acquisition module is connected with the new mesh model generating module.

10. The device according to claim 9, wherein the panoramic image acquisition module comprises:
    a storage unit for the another lens image to be expanded, configured to store the another lens image to be expanded, wherein the storage unit is connected with the new mesh model storage unit;
    a second assigning unit for the lens image, configured to assign the another lens image to be expanded, in the storage unit for the another lens image to be expanded, to the new mesh model in the new mesh model storage unit, wherein the second assigning unit is connected with the storage unit for the another lens image to be expanded;

a new mesh model rendering unit, configured to render the new mesh model in the second assigning unit for the lens image through the GPU to obtain the panoramic image corresponding to the another lens image to be expanded, wherein the new mesh model rendering unit is connected with the second assigning unit for the lens image; and a panoramic image storage unit, configured to store the panoramic image in the new mesh model rendering unit, wherein the panoramic image storage unit is connected with the new mesh model rendering unit.

11. The device according to claim 9, wherein the shape of the original mesh model is selected as a rectangle, a sphere, a 360° panorama, a ring, a hemisphere, or other planar geometric or curved solid geometry.

12. The device according to claim 9, wherein the lens image is selected as a fish eye lens image, a wide-angle lens image or other form of lens image.

13. The device according to claim 9, wherein the shape of the original mesh model is selected as a rectangle, a sphere, a 360° panorama, a ring, a hemisphere, or other planar geometric or curved solid geometry.

14. The device according to claim 9, wherein the lens image is selected as a fish eye lens image, a wide-angle lens image or other form of lens image.

15. The device according to claim 10, wherein the lens image is selected as a fish eye lens image, a wide-angle lens image or other form of lens image.

16. The device according to claim 11, wherein the lens image is selected as a fish eye lens image, a wide-angle lens image or other form of lens image.

* * * * *